United States Patent
Castillo

(10) Patent No.: US 8,193,986 B2
(45) Date of Patent: Jun. 5, 2012

(54) METHOD AND SYSTEM FOR ENHANCING A LOCATION SERVER REFERENCE DATABASE THROUGH ROUND-TRIP TIME (RTT) MEASUREMENTS

(75) Inventor: Manuel del Castillo, Madrid (ES)

(73) Assignee: Broadcom Corporation, Irvine, CA (US)

( * ) Notice: Subject to any disclaimer, the term of this patent is extended or adjusted under 35 U.S.C. 154(b) by 234 days.

(21) Appl. No.: 12/607,266

(22) Filed: Oct. 28, 2009

(65) Prior Publication Data

US 2011/0095946 A1    Apr. 28, 2011

(51) Int. Cl.
*G01S 3/02* (2006.01)
(52) U.S. Cl. ........................................ 342/458
(58) Field of Classification Search .............. 342/458, 342/387, 463–465
See application file for complete search history.

(56) References Cited

U.S. PATENT DOCUMENTS

2006/0009235 A1 * 1/2006 Sheynblat et al. ......... 455/456.1

OTHER PUBLICATIONS

International Telecommunications Union, ITU-T M.3010, Principles for a Telecommunications management network, May 1996.*

* cited by examiner

*Primary Examiner* — Thomas Tarcza
*Assistant Examiner* — Fred H Mull
(74) *Attorney, Agent, or Firm* — Sterne, Kessler, Goldstein & Fox PLLC

(57) ABSTRACT

A mobile device in a cellular communication network collects three or more round-trip time (RTT) measurements for a single active cell. The collected RTT measurements are transmitted to a location server. The location server uses the transmitted RTT measurements to calculate a GNSS position of the single active cell. One or more of the transmitted RTT measurements are taken by the mobile device, and/or are collected from other mobile devices in the single active cell. The transmitted RTT measurements are collected at different GNSS fixes in the same single active cell. The mobile device location stamps the collected RTT measurements using corresponding GNSS fixes, and transmits to the location server using a NML. The location server calculates the GNSS position of the single active cell using location stamped RTT measurements in the received NMLR to refine an associated reference database periodically or aperiodically.

20 Claims, 4 Drawing Sheets

METHOD AND SYSTEM FOR ENHANCING A LOCATION SERVER REFERENCE DATABASE THROUGH ROUND-TRIP TIME (RTT) MEASUREMENTS

CROSS-REFERENCE TO RELATED APPLICATIONS/INCORPORATION BY REFERENCE

Not Applicable.

FIELD OF THE INVENTION

Certain embodiments of the invention relate to signal processing for communication systems. More specifically, certain embodiments of the invention relate to a method and system for enhancing Location server reference database through round-trip time (RTT) measurements.

BACKGROUND OF THE INVENTION

Location based services (LBS) are emerging as a value-added service provided by a mobile communication network. LBS are mobile services in which the user location information is used in order to enable various LBS applications such as, for example, enhanced 911 (E-911) services. A position of a mobile device is determined in different ways such as, for example, using network-based technology, using terminal-based technology, and/or hybrid technology (a combination of the former technologies). Many positioning technologies such as, for example, Cell of Origin (COO), Time of Arrival (TOA), Observed Time Difference of Arrival (OTDOA), Enhanced Observed Time Difference (E-OTD) as well as the satellite-based systems such as the global positioning system (GPS), or Assisted-GPS (A-GPS), are in place to estimate the location of the mobile device and convert it into a meaningful X, Y coordinate for LBS applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for enhancing a location server reference database through round-trip time (RTT) measurements, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for enhancing a location server reference database through round-trip time (RTT) measurements. In accordance with various exemplary embodiments of the invention, a mobile device in a cellular communication network is operable to collect, for example, three or more RTT measurements in a single active cell associated with the mobile device. A RTT measurement at a GNSS fix in the single active cell is the transmission time between a data transmission from the GNSS fix to an associated base station of the active cell and an acknowledgement reception at the GNSS fix from the associated base station of the active cell. The collected RTT measurements in the single active cell are communicated or transmitted to a location server. The location server is operable to use the transmitted RTT measurements to calculate a GNSS position of the single active cell. One or more of the transmitted RTT measurements may be taken by the mobile device, and/or may be collected from one or more other mobile devices associated with the single active cell. The transmitted RTT measurements are collected at different GNSS fixes (longitude, latitude) in the same single active cell. The mobile device may be operable to location stamp the collected RTT measurements using corresponding GNSS fixes, and transmit to the location server, for example, over a Network Management Layer (NML). The location server may be operable to calculate the GNSS position of the single active cell using RTT measurements and corresponding GNSS fixes, which are received over the NML. The calculated GNSS position of the single active cell may be used to refine an associated reference database, which may be refined or updated periodically or aperiodically.

Figure 1:
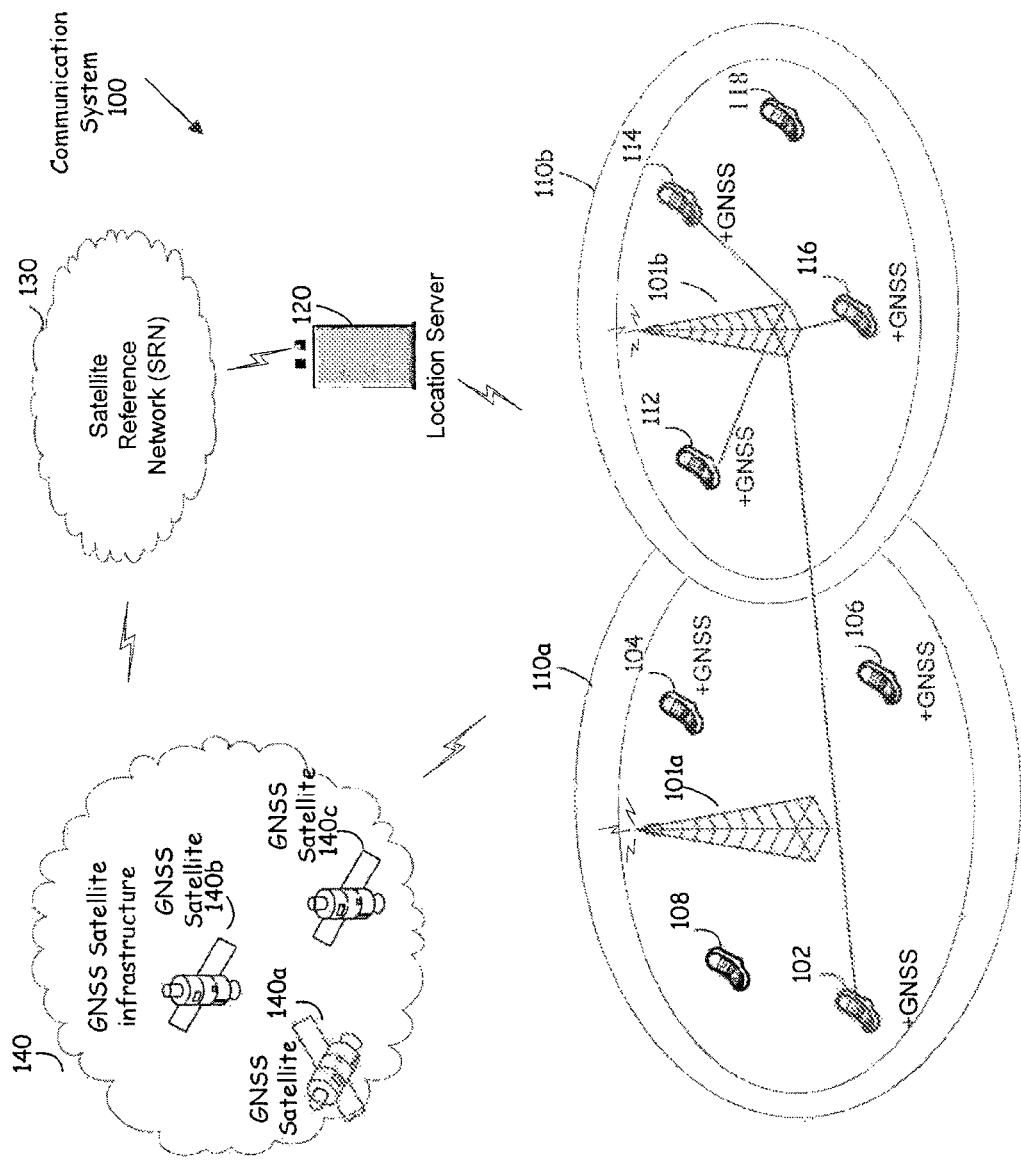
FIG. 1 is a diagram illustrating an exemplary communication system that is operable to enhance a reference database of a location server through RTT measurements, in accordance with an embodiment of the invention.

FIG. 1 is a diagram illustrating an exemplary communication system that is operable to enhance a reference database of a location server through RTT measurements, in accordance with an embodiment of the invention. Referring to FIG. 1, there is shown a communication system 100. The communication system 100 comprises cells 110a-110b, a location server 120, a satellite reference network (SRN) 130 and a GNSS satellite infrastructure 140. The cell 110a comprises a base station (BS) 101a and a plurality of associated mobile devices, of which the GNSS enabled mobile devices 102-106 and a mobile device 108 are illustrated. The cell 110b comprises a BS 101b and a plurality of associated mobile devices, of which GNSS enabled mobile devices 112-116 and a mobile device 118 are illustrated. The GNSS satellite infrastructure 140 comprises a plurality of visible GNSS satellites, of which GNSS satellites 140a-140c are displayed.

The cells 110a-110b comprises geographical areas covered by the BS 101a and the BS 101b, respectively. Each cell may be identified by a unique cell identifier (Cell-ID). For each mobile device such as the GNSS enabled mobile device 102 in the communication system 100, a cell such as the cell 101a may be associated with an active cell set, a candidate cell set or a neighbor cell set of the GNSS enabled mobile device 102. The active cell set comprises a list of cells that are currently connected to the GNSS enabled mobile device 102.

The candidate cell set comprises a list of cells that are not currently connected to the GNSS enabled mobile device 102, but with associated pilot or reference signals strong enough to be added to the active cell set. The neighbor cell set comprises a list of cells that are continuously measured by the GNSS enabled mobile device 102 and corresponding pilot or reference signals are not strong enough to be added to the active cell set.

A mobile device such as the GNSS enabled mobile device 102 may comprise suitable logic, circuitry and/or code that may be operable to communicate with a wireless communication network such as a WCDMA network via the BS 101a. The GNSS enabled mobile device 102 may be operable to communicate radio signals that are compatible with various telecommunication standards such as, for example, 3GPP, with the BS 110a. With GNSS enabled, the GNSS enabled mobile device 102 may be operable to receive GNSS signals from a plurality of visible GNSS satellites such as the GNSS satellites 140a through 140c. The received GNSS signals may be utilized to determine a GNSS fix associated with the GNSS enabled mobile device 102. A quick GNSS fix of the GNSS enabled mobile device 102 may be determined using reference position information, which may be provided by the location server 120. In this regard, the GNSS enabled mobile device 102 may be operable to select one or more cells from the associated active cell set. For each selected cell such as the cell 101b, the GNSS enabled mobile device 102 may be operable to take or collect Round Trip Time (RTT) measurements at, for example, three or more different GNSS fixes in the cell 101b. A RTT measurement at a GNSS fix in an active cell is the transmission time between a data transmission from the GNSS fix to the active cell and an acknowledgement reception at the GNSS fix from the active cell. A RTT measurement at a GNSS fix in an active cell may be directly related to a distance between the GNSS fix and an associated BS of the active cell. The collected RTT measurements at different GNSS fixes in the cell 101b may be location stamped using corresponding GNSS fixes. In an exemplary embodiment of the invention, three or more location stamped RTT measurements may be collected. The collected location stamped RTT measurements may be measured by the GNSS enabled mobile device 102 alone or may be collected from other mobile devices such as the GNSS enabled mobile device 104 associated with the same active cell. The GNSS enabled mobile device 102 may be operable to send the collected location stamped RTT measurements via a serving BS such as the BS 101a over a NML to the location server 120. The collected location stamped RTT measurements may be utilized for accurately positioning the corresponding active cell such as the cell 110b.

The location server 120 may comprise suitable logic, circuitry and/or code that may be operable to access the satellite reference network (SRN) 130 to collect GNSS satellite data by tracking GNSS constellations through the SRN 130. The location server 120 may be operable to utilize the collected GNSS satellite data to build a reference database, which may be utilized to provide GNSS assistance data to support LBS services. In this regard, the location server 120 may be operable to receive NMLs from a plurality of associated mobile devices. The received NMLs may comprise location stamped RTT measurements. The location server 120 may be operable to utilize the received location stamped RTT measurements to compute GNSS positions of one or more cells of interest. In an exemplary embodiment of the invention, three or more location stamped RTT measurements in a particular cell may be required to calculate a corresponding GNSS position of the particular cell. Associated GNSS fixes of the location stamped RTT measurements are different GNSS positions in the particular cell. The location server 120 may be operable to utilize the calculated GNSS positions of corresponding cells of interest to refine or update reference database. The location server 120 may be operable to message in exemplary formats compatible with telecommunication networks such as WCDMA. For example, the location server 120 may be WCDMA standard compliant by supporting messaging in RRLP format, PCAP interface and/or OMA SUPLv1.0. The location server 120 may be configured to communicate with a mobile device such as the GNSS enabled mobile device 102 in either a user-plane or a control-plane.

The SRN 130 may comprise suitable logic, circuitry and/or code that may be operable to collect and distribute data for GNSS satellites on a continuous basis. The SRN 130 may comprise a plurality of GNSS reference tracking stations located around the world to provide A-GNSS coverage all the time in both a home network and/or any visited network. This allows users of the GNSS enabled devices such as the GNSS enabled mobile device 102 to roam with associated LBS anywhere in the world. The SRN 130 may be operable to ensure high levels of availability and reliability for LBS performance.

The GNSS satellites 140a through 140c may comprise suitable logic, circuitry and/or code that may be operable to generate and broadcast satellite navigational information in suitable radio-frequency (RF) signals to various GNSS capable devices such as, the GNSS enabled device 102. The broadcast satellite navigational information may be utilized to support LBS services. The GNSS satellites 140a through 140c may be GPS, Galileo, and/or GLONASS satellites.

In an exemplary operation, a mobile device such as the GNSS enabled mobile device 102 may be operable to select a cell from an associated active cell set. The GNSS enabled mobile device 102 may be operable to take or collect RTT measurements at, for example, three or more different GNSS fixes in the selected cell. The collected RTT measurements may be location stamped using the corresponding GNSS fixes, where the RTT measurements are performed. The GNSS enabled mobile device 102 may be operable to communicate with an associated serving BS such as the BS 101a to send the location stamped RTT measurements over a NML to the location server 120. The location server 120 may be operable to utilize the location stamped RTT measurements in the received NML to compute the GNSS position of the cell 110b. The location server 120 may be operable to utilize the computed GNSS position of the cell 110b to refine reference database.

Figure 2:
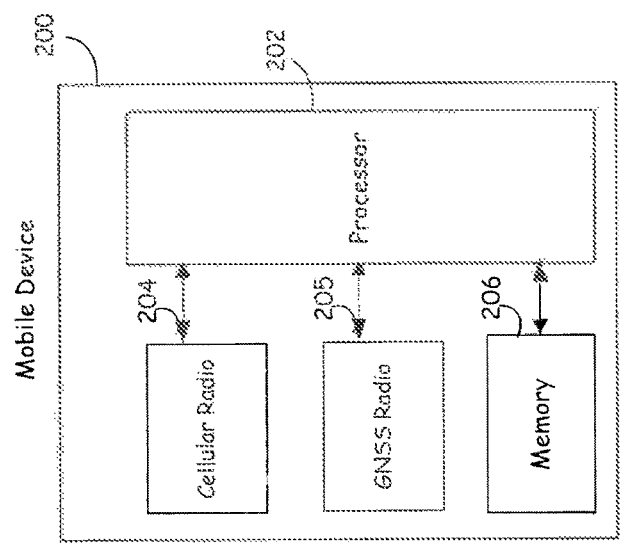
FIG. 2 is a diagram illustrating an exemplary mobile device that is operable to provide location stamped RTT measurements to a location server, in accordance with an embodiment of the invention.

FIG. 2 is a diagram illustrating an exemplary mobile device that is operable to provide location stamped RTT measurements to a location server, in accordance with an embodiment of the invention. Referring to FIG. 2, there is shown a GNSS enabled mobile device 200 comprising a processor 202, a cellular radio 204, a GNSS radio 205 and a memory 206.

The processor 202 may comprise suitable logic, circuitry, interfaces and/or code that may be operable to manage and/or control operations of associated component units such as, for example, the cellular radio 204 and the GNSS radio 205. For example, the processor 202 may be operable to activate the cellular radio 204 to take or collect RTT measurements at three or more different GNSS fixes in a cell of interest. The cell of interest may be selected from an associated active cell set of the mobile device 200. The collected RTT measurements may be taken by the cellular radio 204 or may be collected from other mobile devices that are associated with the cell of interest. The processor 202 may be operable to transmit the location stamped RTT measurement of the cell of interest to the location server 120 via a serving BS such as the BS 101a. The transmitted location stamped RTT measurements may be utilized for computing the GNSS position of the cell of interest.

The cellular radio 204 may comprise suitable logic, circuitry, interfaces and/or code that may be operable to transmit and/or receive radio signals in cellular spectrum. The radio signals transmitted and/or received may be processed via the processor 202. In this regard, the cellular radio 204 may be operable to perform RTT measurements at particular GNSS fixes within an active cell of interest. The RTT measurements may be location stamped and transmitted over a NML to the location server 120.

The GNSS radio 205 may comprise suitable logic, circuitry, interfaces and/or code that may be operable to receive GNSS satellite broadcast signals. The received GNSS satellite broadcast signals may be processed to provide a navigation solution such as a GNSS fix of the mobile device 200. In this regard, RTT measurements may be performed or collected for three or more different GNSS fixes within an active cell of interest. The resulting RTT measurements may be location stamped using corresponding GNSS fixes and communicated to the location server 120 for cell positioning.

The memory 206 may comprise suitable logic, circuitry, interfaces and/or code that may be operable to store information such as executable instructions and data that may be utilized by the processor 202 and/or other associated component units such as, for example, the cellular radio 204. The memory 206 may comprise RAM, ROM, low latency non-volatile memory such as flash memory and/or other suitable electronic data storage.

In an exemplary operation, the mobile device 200 may be operable to receive broadcast satellite signals via the GNSS radio 205. The received satellite signals may be used to calculate a navigational solution such as a GNSS fix of the mobile device 200. For a particular GNSS fix, the processor 202 may be operable to activate the cellular radio 204 to take or collect RTT measurements for an active cell of interest. The RTT measurements may be taken by the cellular radio 204 or may be collected from other mobile devices that are associated with the active cell of interest. The RTT measurements may be generated from, for example, three or more different GNSS positions in the same active cell of interest. The RTT measurements may be location stamped using corresponding GNSS fixes. The location stamped RTT measurements may be transmitted over a NML to the location server 120. The transmitted location stamped RTT measurements may be utilized to enhance cell positioning.

Figure 3:
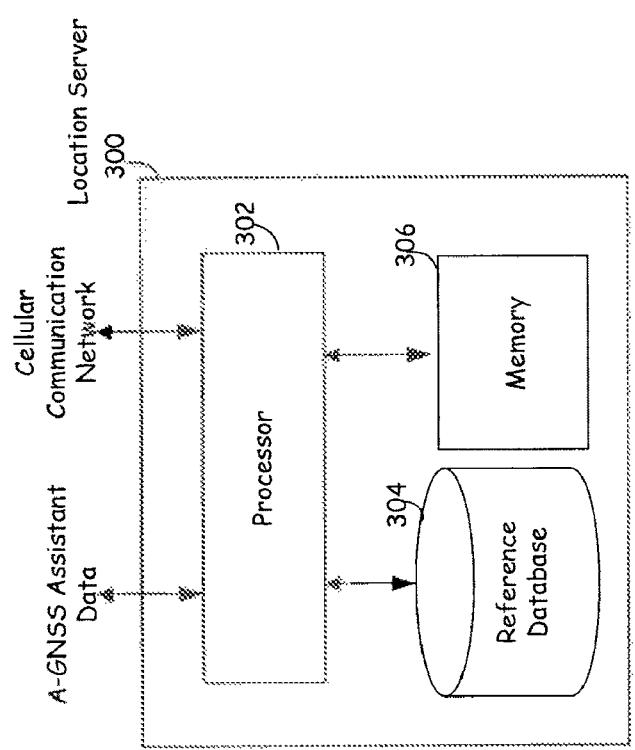
FIG. 3 is a diagram illustrating an exemplary location server that is operable to calculate cell GNSS fixes using corresponding location stamped RTT measurements, in accordance with an embodiment of the invention.

FIG. 3 is a diagram illustrating an exemplary location server that is operable to calculate cell GNSS fixes using corresponding location stamped RTT measurements, in accordance with an embodiment of the invention. Referring to FIG. 3, there is shown a location server 300. The location server 300 comprises a processor 302, a reference database 304 and a memory 306.

The processor 302 may comprise suitable logic, circuitry, interfaces and/or code that may be operable to access the SRN 130 to collect GNSS satellite data by tracking GNSS constellations through the SRN 130. The processor 302 may be operable to utilize the collected GNSS satellite data to build the reference database 304, which may provide GNSS assistance data to support LBS services. In this regard, the processor 302 may be operable to receive NMLs from a plurality of mobile devices via a communication network such as a WCDMA network. The received NMLs may comprise location stamped RTT measurements, which comprise RTT measurements and corresponding GNSS fixes where the RTT measurements are performed.

The processor 302 may be operable to utilize the received location stamped RTT measurements to compute GNSS locations of one or more associated cells of interest. For example, for a particular cell, the processor 302 may be operable to extract location stamped RTT measurements corresponding to the particular cell from the received NMLs. The extracted location stamped RTT measurements comprise RTT measurements and corresponding GNSS fixes in the particular cell. An extracted location stamped RTT measurement is directly related to a distance between an associated GNSS fix and the particular cell, for example, in steps of 50 m as per the following series of {25, 75, 125, 175, 225, 275, 325, 375, 425, 475}. In an exemplary embodiment of the invention, three or more location stamped RTT measurements in the same particular cell may be required so as to compute the GNSS location of the particular cell.

The processor 302 may be operable to approximate the distance between two points on the surface of the earth using a corresponding distance in a flat surface. In this regard, in instances where parameter Loc_BS is the location of a cell of interest and parameter GNSS_RTT is a GNSS fix where the corresponding RTT measurement is performed, the distance between the GNSS fix of the corresponding RTT measurement (GNSS_RTT) and the location of the cell of interest (Loc_BS), namely, Distance_BS_RTT, may be approximated utilizing the following relationship:

$$\text{Distance}\_BS\_RTT = |GNSS\_RTT - Loc\_BS|,$$

that is a corresponding distance in a flat surface. The parameter Distance_BS_RTT is directly related to a corresponding RTT measurement in steps of 50 m. The location of the cell of interest may be calculated or solved using the following exemplary relationship:

$$GNSS\_BS = \min \sum_{i \geq 2} |\text{Distance}\_BS\_RTT\_i - |GNSS\_RTT\_i - Loc\_BS||,$$

where i is an integer and is greater than 2. The calculated location of the cell of interest may be utilized to refine the reference database 304. The processor 302 may be operable to communicate message in exemplary formats that are compatible with telecommunication networks such as WCDMA. For example, the processor 302 may be operable to support messaging in RRLP format, PCAP interface and/or OMA SUPLv1.0. The processor 302 may be configured to communicate with a mobile device such as the GNSS enabled mobile device 102 in either a user-plane or a control-plane for a NML periodically or aperiodically.

The reference database 304 may comprise suitable logic, circuitry, interfaces and/or code that may be operable to manage and/or store data comprising reference positions and/or location information that is captured, determined and/or learned from a plurality of associated mobile devices. In this regard, the reference database 304 may be refined or updated using cell GNSS locations that are derived or calculated using corresponding location stamped RTT measurements. The contents in the reference database 304 may be updated as needed or periodically.

The memory 306 may comprise suitable logic, circuitry, interfaces and/or code that may be operable to store information comprising executable instructions that may be utilized by the processor 302. The executable instructions may comprise algorithms that may be utilized to calculate GNSS locations of one or more cells of interest according to corresponding location stamped RTT measurements. The memory 306 may comprise RAM, ROM, low latency nonvolatile memory such as flash memory and/or other suitable electronic data storage.

In operation, the processor 302 may be operable to learn and refine location information for one or more cell of interest according to corresponding location stamped RTT measurements. The processor 302 may be operable to receive NMLs from a plurality of associated mobile devices such as, the GNSS enabled mobile device 102. The received NMLs may comprise location stamped RTT measurements. A location stamped RTT measurement comprises a RTT measurement and an association GNSS fix where the RTT measurement is performed. GNSS locations of one or more associated cells of interest may be calculated using the received location stamped RTT measurements. In various exemplary embodiments of the invention, three or more location stamped RTT measurements that are taken at different GNSS fixes in a cell of interest may be required to compute a corresponding location of the cell of interest. The calculated cell GNSS locations may be utilized to refine the reference database 304 to enhance LBS service performance such as speed and/or accuracy. The reference database 304 may be updated periodically or on an as needed basis.

Figure 4:
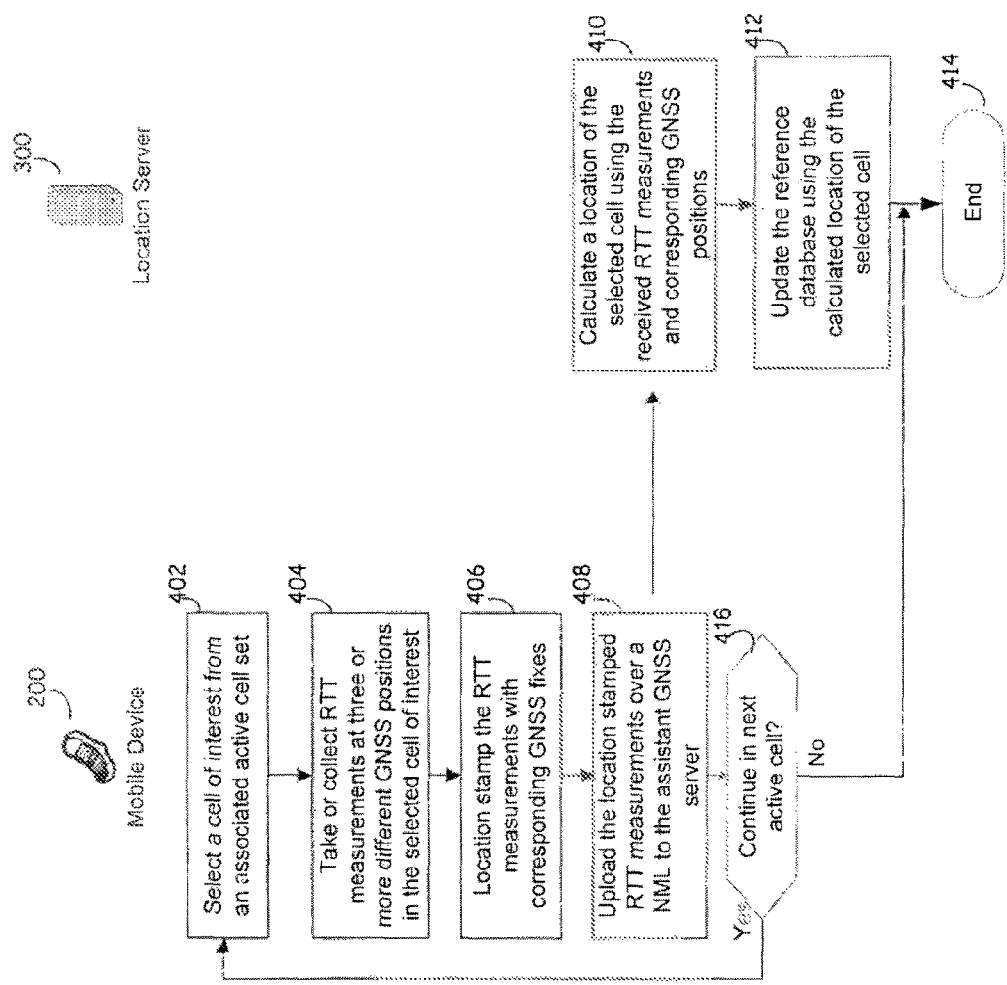
FIG. 4 is a flow chart illustrating an exemplary process utilized by a location server to refine a reference database through location stamped RTT measurements, in accordance with an embodiment of the invention.

FIG. 4 is a flow chart illustrating an exemplary process utilized by a location server to refine a reference database through location stamped RTT measurements, in accordance with an embodiment of the invention. Referring to FIG. 4, the exemplary steps start with step 402, where a mobile device such as the mobile device 200 may be operable to select a cell of interest from an associated active cell set. In step 404, the mobile device 200 may be operable to take or collect from other mobile device RTT measurements at, for example, three or more different GNSS positions in the selected cell of interest. In step 406, the mobile device 200 may be operable to location stamp the collected RTT measurements with corresponding GNSS fixes. In step 408, the mobile device 200 may be operable to upload the location stamped RTT measurements over a NML to the location server 300. In step 410, the location server 300 may be operable to calculate a GNSS location of the selected cell using the RTT measurements and corresponding GNSS positions received over a NML. In step 412, the location server 300 may be operable to utilize the calculated GNSS location of the selected cell to update the reference database 304. The exemplary steps may be ended in step 414.

In step 416, it may be determined whether the RTT measurement process may continue for a next active cell. In instances where the RTT measurement process may continue for the next active cell, the exemplary steps may return to step 402.

In step 416, in instances where the RTT measurement process may not continue for the next active cell, the exemplary steps may end at step 414.

Aspects of a method and system for enhancing a location server reference database through RTT measurements are provided. In accordance with various exemplary embodiments of the invention, as described with respect to FIG. 1 through FIG. 4, a mobile communication device such as the mobile device 200 may be operable to collect, for example, three or more RTT measurements in a single active cell such as the cell 110b associated with the mobile device 200. The collected RTT measurements in the single active cell may be transmitted to the location server 300. The location server 300 may be operable to use the transmitted RTT measurements to calculate a GNSS position as a position estimate of the active cell. For example, the location server 300 may be operable to apply various algorithms such as, for example, server-based triangulation algorithms to calculate the position estimate of the active cell using the received RTT measurement transmissions. One or more of the transmitted RTT measurements may be taken by the mobile device 200, and/or may be collected from one or more other mobile devices in the single active cell. The transmitted RTT measurements are collected at different GNSS fixes in the same single active cell. The collected RTT measurements may be location stamped using corresponding GNSS fixes. The mobile device 200 may be operable to transmit the location stamped RTT measurements to the location server 300, for example, using a NML. The location server 300 may be operable to calculate the GNSS position of the single active cell using RTT measurements and corresponding GNSS fixes in the received NML. The calculated GNSS position of the single active cell may be used to refine the reference database 304. The reference database 304 may be refined or updated periodically or aperiodically.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for enhancing a location server reference database through RTT measurements.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
performing by one or more processors and/or circuits in a mobile communication device:

collecting three or more round trip time (RTT) measurements for a single active cell associated with said mobile communication device, wherein the RTT measurements comprise one or more other mobile device RTT measurements; and transmitting said collected RTT measurements to a location server, wherein said RTT measurements collected for said single active cell are used by said location server to calculate a GNSS location of said single active cell.

2. The method according to claim 1, wherein one or more of said three or more RTT measurements are taken by one or more other mobile communication devices in said single active cell.

3. The method according to claim 2, comprising collecting said one or more of said three or more RTT measurements from said one or more other mobile devices associated with said active cell.

4. The method according to claim 1, comprising collecting each of said three or more RTT measurements at a different GNSS fix in said single active cell.

5. The method according to claim 4, comprising location stamping each of said collected three or more RTT measurements using a corresponding GNSS fix in said associated active cell.

6. The method according to claim 5, comprising transmitting said location stamped three or more RTT measurements to said location server.

7. The method according to claim 6, wherein said location server calculates said GNSS position of said single active cell using said transmitted location stamped three or more RTT measurements.

8. The method according to claim 7, wherein said location server refines an associated reference database using said calculated GNSS position of said single active cell.

9. The method according to claim 7, wherein said location server refines an associated reference database periodically or aperiodically.

10. The method according to claim 5, comprising transmitting said location stamped three or more RTT measurements to said location server using a Network Management Layer (NML).

11. A system for processing signals, the system comprising:
one or more processors and/or circuits for use in a mobile communication device, wherein said one or more processors and/or circuits are operable to:
collect three or more round trip time (RTT) measurements for a single active cell associated with said mobile communication device, wherein the RTT measurements comprise one or more other mobile device RTT measurements; and
transmit said collected RTT measurements to a location server, wherein said RTT measurements collected for said single active cell are used by said location server to calculate a GNSS location of said single active cell.

12. The system according to claim 11, wherein one or more of said three or more RTT measurements are taken by one or more other mobile communication devices in said single active cell.

13. The system according to claim 12, wherein said one or more processors and/or circuits are operable to collect said one or more of said three or more RTT measurements from said one or more other mobile devices associated with said active cell.

14. The system according to claim 11, wherein said one or more processors and/or circuits are operable to collect each of said three or more RTT measurements at a different GNSS fix in said associated active cell.

15. The system according to claim 14, wherein said one or more processors and/or circuits are operable to location stamp each of said collected three or more RTT measurements using a corresponding GNSS fix in said associated active cell.

16. The system according to claim 15, wherein said one or more processors and/or circuits are operable to transmit said location stamped three or more RTT measurements to said location server.

17. The system according to claim 16, wherein said location server calculates said GNSS position of said single active cell using said transmitted location stamped three or more RTT measurements.

18. The system according to claim 17, wherein said location server refines an associated reference database periodically or aperiodically.

19. The system according to claim 15, wherein said one or more processors and/or circuits are operable to transmit said location stamped three or more RTT measurements to said location server using a Network Management Layer (NML).

20. A system for processing signals, the system comprising:
a mobile communication device operable to:
collect three or more round trip time (RTT) measurements for a base station, wherein the RTT measurements comprise one or more other mobile device RTT measurements; and
transmit the collected RTT measurements to a location server, wherein the RTT measurements collected for the base station are used by the location server to calculate a corrected location of the base station.

* * * * *

UNITED STATES PATENT AND TRADEMARK OFFICE
CERTIFICATE OF CORRECTION

PATENT NO. : 8,193,986 B2
APPLICATION NO. : 12/607266
DATED : June 5, 2012
INVENTOR(S) : Manuel del Castillo It is certified that error appears in the above-identified patent and that said Letters Patent is hereby corrected as shown below:

Title Page
Item (12), please replace "Castillo" with --del Castillo--.

Column 9
Lines 4-5, Claim 1, please replace "one or more other mobile device RTT measurements" with --RTT measurements for one or more other mobile devices--.

Column 9
Lines 51-52, Claim 11, please replace "one or more other mobile device RTT measurements" with --RTT measurements for one or more other mobile devices--.

Column 10
Lines 44-45, Claim 20, please replace "one or more other mobile device RTT measurements" with --RTT measurements for one or more other mobile devices--.

Signed and Sealed this
Nineteenth Day of February, 2013

Teresa Stanek Rea
*Acting Director of the United States Patent and Trademark Office*